United States Patent
Hirasawa (10) Patent No.: US 11,472,077 B2
(45) Date of Patent: Oct. 18, 2022

(54) INJECTION MOLDING MOLD APPARATUS AND METHOD FOR MANUFACTURING INJECTION-MOLDED ARTICLE

(71) Applicant: TOKAI KOGYO CO., LTD., Obu (JP)

(72) Inventor: Kazuo Hirasawa, Obu (JP)

(73) Assignee: TOKAI KOGYO CO., LTD., Obu (JP)

( * ) Notice: Subject to any disclaimer, the term of this patent is extended or adjusted under 35 U.S.C. 154(b) by 0 days.

(21) Appl. No.: 16/811,300

(22) Filed: Mar. 6, 2020

(65) Prior Publication Data

US 2020/0282611 A1 Sep. 10, 2020

(30) Foreign Application Priority Data

Mar. 8, 2019 (JP) .............................. JP2019-042159

(51) Int. Cl.
*B29C 45/14* (2006.01)
*B29C 45/26* (2006.01)

(52) U.S. Cl.
CPC ........ *B29C 45/14065* (2013.01); *B29C 45/26* (2013.01)

(58) Field of Classification Search
CPC ... B29C 45/14065; B29C 45/26; B29C 44/18; B22F 7/04
See application file for complete search history.

(56) References Cited

U.S. PATENT DOCUMENTS 9,511,522 B2 * 12/2016 Kong ...................... B29C 51/10
2005/0232803 A1 * 10/2005 Kuttler ................. B29C 45/332
419/9

FOREIGN PATENT DOCUMENTS

CN 102470588 A * 12/2011 ............. B29C 45/27
JP 2004-314338 A 11/2004

* cited by examiner

*Primary Examiner* — Jeffrey M Wollschlager
*Assistant Examiner* — Shibin Liang
(74) *Attorney, Agent, or Firm* — Oliff PLC (57) ABSTRACT

An injection molding mold apparatus including: a first mold and a second mold forming a cavity into which thermoplastic resin is configured to be injected; a slide mold provided on at least one of the first and second molds, capable of moving back and forth in a direction intersecting a mold opening and closing direction, and forming a part of the cavity while being in pressure contact with an insert member during molding; and a pressing member provided at a portion where the slide mold is not provided among portions of the first and second molds that face each other and at a position corresponding to a tip end portion of the slide mold, being movable in the mold opening and closing direction, and pressing and moving the tip end portion in the mold opening and closing direction when the first and second molds are closed.

10 Claims, 8 Drawing Sheets

INJECTION MOLDING MOLD APPARATUS AND METHOD FOR MANUFACTURING INJECTION-MOLDED ARTICLE

CROSS-REFERENCE TO RELATED APPLICATIONS

This application claims priority from Japanese Patent Application No. 2019-042159 filed on Mar. 8, 2019, the entire contents of which are incorporated herein by reference.

TECHNICAL FIELD

The present disclosure relates to an injection molding mold apparatus used when manufacturing an injection-molded article in which a part of an insert member is exposed to outside of a coating resin, and a method for manufacturing the injection-molded article by using the injection molding mold apparatus.

BACKGROUND ART

In related art, as one type of method for manufacturing an injection-molded article, an insert molding method using a mold apparatus is well known. The injection-molded article manufactured by the insert molding method has a structure in which an insert member is embedded in a coating resin made of a thermoplastic resin. Examples of products of the injection-molded article manufactured by the insert molding method can include electric components such as a motor, an actuator, a solenoid valve, and a booster apparatus. In these products, since heat is likely to be generated by energization, a portion in which a part of the insert member is exposed to outside may be provided in order to cause the heat to escape to outside.

As a mold apparatus for manufacturing this type of injection-molded article, a mold apparatus having a structure in which a slide mold is provided between an upper mold and a lower mold that face each other has been proposed in related art (see, for example, JP-A-2004-314338). The upper mold and the lower mold of the mold apparatus are in contact with and separated from each other, and form a cavity in which a thermoplastic resin is injected when the molds are closed. The slide mold provided on the lower mold forms an exposed portion of the insert member, and has a structure capable of being moved back and forth in a direction orthogonal to an opening and closing direction of the molds. Further, the slide mold has a structure in which a tip end portion thereof is moveable in a mold opening and closing direction while forming a part of the cavity. In the insert molding method using such a mold apparatus, first, the insert member is placed between the upper mold and the lower mold and the molds are closed, and the slide mold is moved forward to cause the slide mold to be in pressure contact with the insert member when the molds are closed. At this time, the insert member is fixed by the upper mold, the lower mold, and the slide mold, and the cavity is formed by the insert member and each mold. Next, the thermoplastic resin which is melted is injected and filled into the cavity, whereby the injection-molded article in which a part of the insert member is integrally coated with the thermoplastic resin is manufactured. In a case of this type of mold apparatus, it is known that even when there is a slight variation in a size or a shape of the insert member, the variation of the insert member is absorbed by the slide mold, and occurrence of a burr on the exposed portion is prevented.

However, in a case of the mold apparatus in the related art as described above, even when the slide mold is used, only a variation of the insert member in one direction (that is, a variation in a direction of a surface in pressure contact with the slide mold) can be absorbed. Therefore, there is a defect that the insert molding cannot be performed without generating a burr on the exposed portion of the insert member which varies in two different directions.

As a method for solving this defect, a method in which a resin member (spacer) formed separately from a mold apparatus is used, and insert molding is performed in a state where the resin member is in contact with a surface of an insert member to prevent occurrence of a burr has been proposed in related art. According to this method, for example, even when it is desired to form an exposed portion over two continuous surfaces of the insert member, it is considered that molding may be performed without generating a burr on the exposed portion.

However, in a case of this method, in addition to necessity of manufacturing the resin member separately, work of setting the resin member at a predetermined position in the molds is required. Therefore, there is a disadvantage that a manufacturing cost of the injection-molded article is likely to increase. Further, since a defect may occur in which a separate body is damaged or misaligned during injection molding, there is also a risk that a yield of a product may be deteriorated, which may result in an increase in a cost.

SUMMARY

The present disclosure has been made in view of the above problems, and an object thereof is to provide an injection molding mold apparatus for molding an injection-molded article and a method for manufacturing the injection-molded article in both of which, during manufacturing of the injection-molded article including an exposed portion continuous over two surfaces, insert molding can be performed without generating a burr on the exposed portion on each surface while avoiding an increase in a cost.

In order to solve the above problems, an aspect of the disclosure provides an injection molding mold apparatus for manufacturing an injection-molded article in which an insert member is embedded in a coating resin made of a thermoplastic resin and a part of the insert member is exposed to outside, the injection molding mold apparatus including: a first mold and a second mold capable of being in contact with and separated from each other and forming a cavity into which the thermoplastic resin is configured to be injected when the first mold and the second mold are closed; a slide mold provided on at least one of the first mold and the second mold, and capable of moving back and forth in a direction intersecting a mold opening and closing direction, and forming a part of the cavity while being in pressure contact with the insert member during molding, at least a tip end portion of the slide mold being movable in the mold opening and closing direction; and a pressing member provided at a portion where the slide mold is not provided among portions of the first mold and the second mold that face each other and at a position corresponding to the tip end portion of the slide mold, being movable in the mold opening and closing direction, and pressing and moving the tip end portion in the mold opening and closing direction when the first mold and the second mold are closed.

Therefore, according to the aspect of the disclosure, since the slide mold is moved, in accordance with the insert member in a direction (mold opening and closing direction) different from a sliding direction of the slide mold, by the pressing member, variations of the insert member respectively in different directions are absorbed by the slide mold and the pressing member. Therefore, molding can be performed without generating a burr on an exposed portion over two continuous surfaces of the insert member. Further, since it is not necessary to set a separate resin member in the molds to prevent occurrence of a burr, an increase in a cost can be prevented, and a risk of breakage of the separate resin member can also be eliminated.

According to another aspect of the disclosure, there is provided a method for manufacturing an injection-molded article by using an injection molding mold apparatus, the mold apparatus being for manufacturing the injection-molded article in which an insert member is embedded in a coating resin made of a thermoplastic resin and a part of the insert member is exposed to outside, the injection molding mold apparatus including: a first mold and a second mold capable of being in contact with and separated from each other and forming a cavity into which the thermoplastic resin is configured to be injected when the first mold and the second mold are closed; a slide mold provided on at least one of the first mold and the second mold, and capable of moving back and forth in a direction intersecting a mold opening and closing direction, and forming a part of the cavity while being in pressure contact with the insert member during molding, at least a tip end portion of the slide mold being movable in the mold opening and closing direction; and a pressing member provided at a portion where the slide mold is not provided among portions of the first mold and the second mold that face each other and at a position corresponding to the tip end portion of the slide mold, being movable in the mold opening and closing direction, and pressing and moving the tip end portion in the mold opening and closing direction when the first mold and the second mold are closed, the method for manufacturing the injection-molded article including: placing the insert member between the first mold and the second mold in a state where the first mold and the second mold are opened; moving the slide mold forward to cause the slide mold to be in pressure contact with the insert member, and pressing the tip end portion of the slide mold by the pressing member, during closing of the first mold and the second mold; fixing the insert member by the first mold and the second mold, and forming the cavity by the insert member, the first mold, the second mold and the slide mold; and injecting and filling the thermoplastic resin which is melted into the cavity and integrally coating a part of the insert member with the thermoplastic resin.

Therefore, according to the other aspect of the disclosure, the tip end portion of the slide mold is pressed by the pressing member when the slide mold is in pressure contact with the insert member during closing of the first mold and the second mold. As a result, the slide mold is moved in accordance with the insert member in a direction (mold opening and closing direction) different from a sliding direction of the slide mold. Therefore, variations of the insert member respectively in different directions are absorbed by the slide mold and the pressing member. When closing of the molds is completed, the insert member is fixed in a non-slidable manner while maintaining a state where the variations are absorbed, and the cavity is formed. Then, the thermoplastic resin which is melted is injected and filled into the cavity, whereby other portions can be integrally coated with the thermoplastic resin without generating a burr on an exposed portion of the insert member over two continuous surfaces.

DETAILED DESCRIPTION

First Embodiment

Hereinafter, a mold apparatus for molding an injection-molded article according to an embodiment of the present disclosure will be described in detail with reference to FIGS. 1 to 5.

Figure 1:
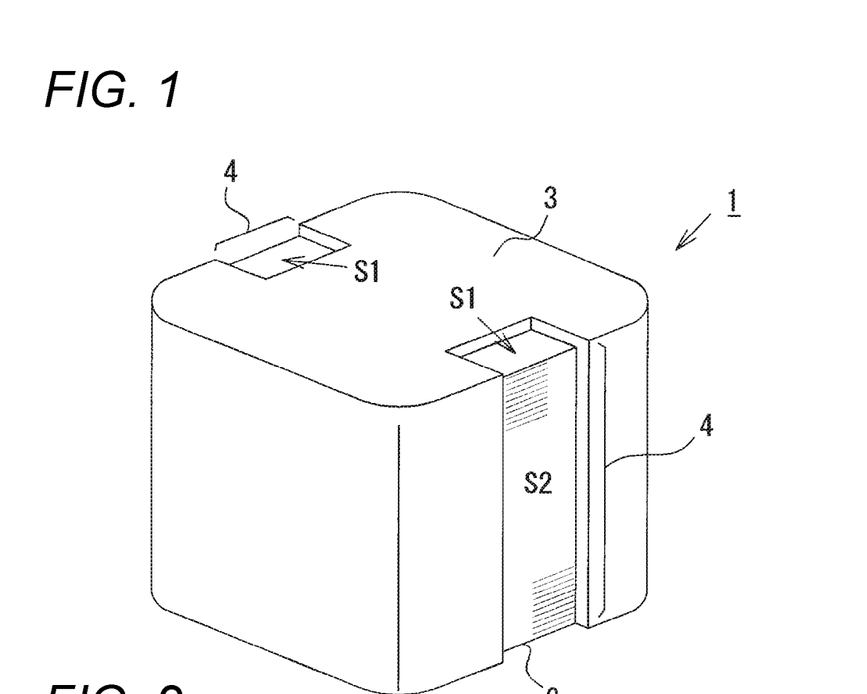
FIG. 1 is a schematic perspective view showing an injection-molded article manufactured using a mold apparatus according to a first embodiment of the present disclosure.

FIG. 1 shows an injection-molded article 1 manufactured using a mold apparatus 11 in the present embodiment. The injection-molded article 1 is an insert molded article manufactured by an insert molding method that is a type of injection molding method, and is a substantially cubic structure in which an insert member 2 is embedded in a coating resin 3 made of a thermoplastic resin. The thermoplastic resin that is a material for molding the coating resin 3 is not particularly limited. For example, a PPS resin, or a PBT resin is used. In order to reduce a thermal expansion coefficient, an inorganic substance such as glass fibers or glass particles may be added to these resin materials as a filler. As the insert member 2, any insert member can be selected without a particular limitation on a material, a shape, and the like as long as the insert member is a structure formed in advance using a material different from the resin material used for the coating resin 3. In the present embodiment, a laminated core formed by bonding and fixing a large number of rectangular ring-shaped metal plates (core pieces) to one another in a laminated state is used as the insert member 2, but may be, for example, a coil formed by winding a round wire or a flat wire, a structure made of metal such as a dust core or a bus bar, or a structure such as a spacer formed of ceramics or a resin. In the insert member 2 in FIG. 1, surfaces facing upward or downward are defined as first surfaces S1, and a surface in a positional relationship orthogonal to these surfaces is defined as a second surface S2. When the insert member 2 that is the laminated core is viewed microscopically, a variation in a size or a shape of the second surface S2 is larger than a variation in a size or a shape of the first surface S1, which is because a position of an end face of each core piece is not completely constant, and fine unevenness is formed on the end face.

As shown in FIG. 1, although the insert member 2 is mostly covered by the coating resin 3, there are two portions (exposed portions 4) that expose parts of the insert member 2 to outside. Each of the exposed portions 4 in the present embodiment has a shape that extends in a strip shape along an upper-lower direction in FIG. 1. These exposed portions 4 each are formed over two continuous surfaces (the first surface S1 and the second surface S2) in the insert member 2.

Figure 2:
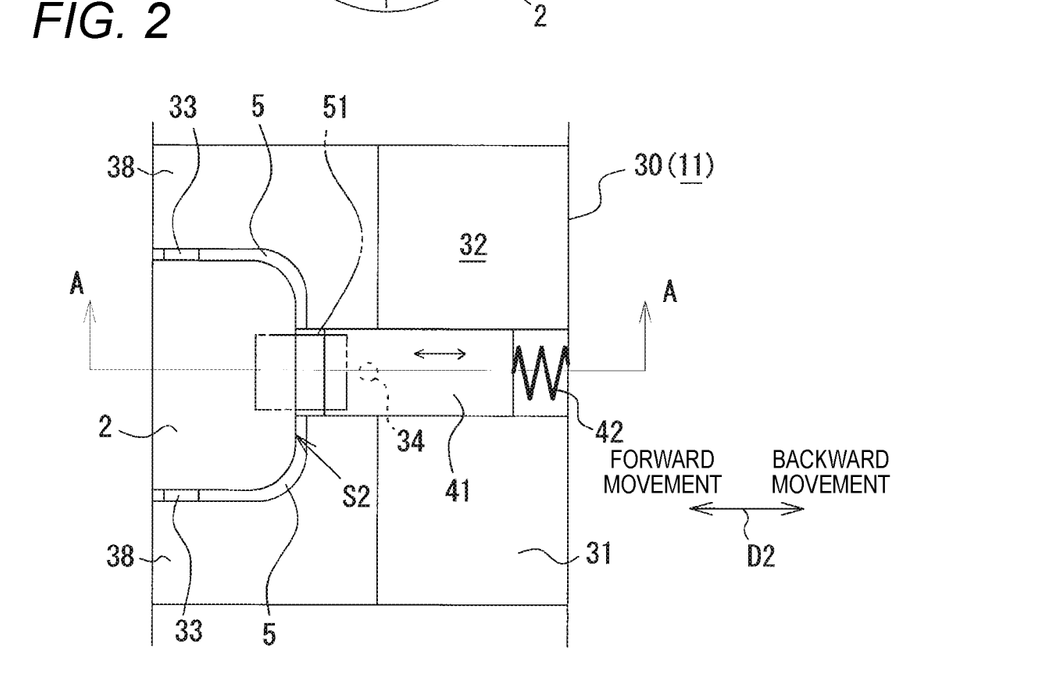
FIG. 2 is a partial plan view of a lower mold of the mold apparatus according to the first embodiment.
Figure 3:
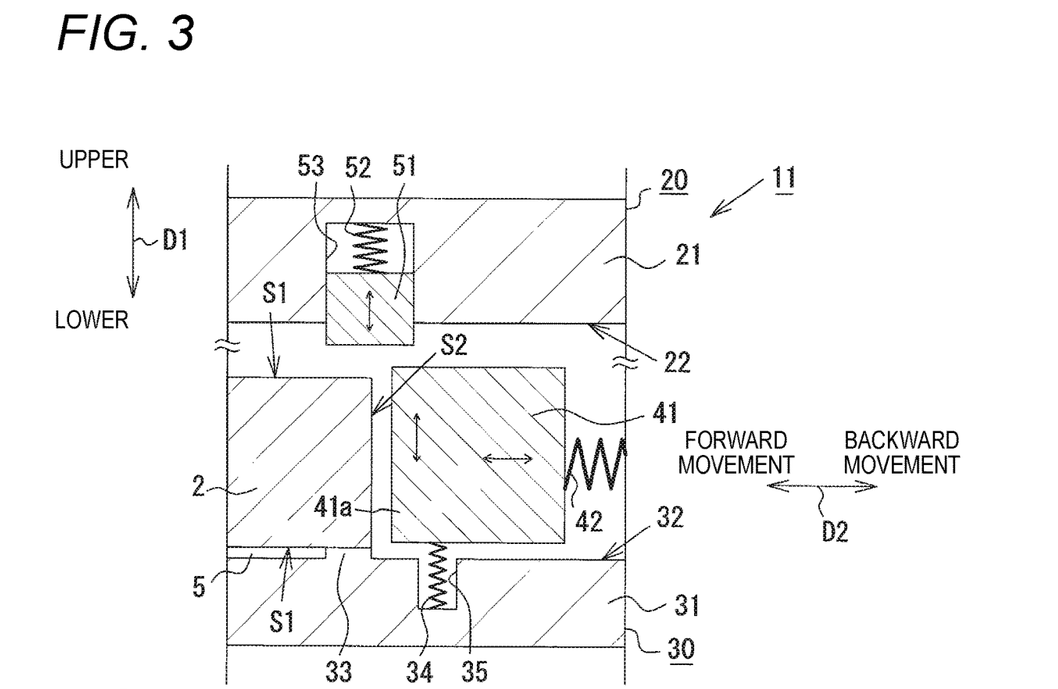
FIG. 3 is a cross-sectional view (longitudinal cross-sectional view of main parts) taken along a line A-A of the mold apparatus according to the first embodiment.

Next, the mold apparatus 11 for manufacturing the injection-molded article 1 having the above structure will be described. FIG. 2 is a partial plan view of a lower mold 30 of the mold apparatus 11. FIG. 3 is a cross-sectional view (longitudinal cross-sectional view of main parts) taken along a line A-A in FIG. 2. In these drawings, a double-headed arrow labeled D1 indicates a mold opening and closing direction D1. A double-headed arrow labeled D2 indicates a moving direction D2 of a slide mold 41 to be described below among directions orthogonal to the mold opening and closing direction D1.

As shown in FIGS. 2 and 3, the mold apparatus 11 includes an upper mold 20 (first mold), the lower mold 30 (second mold), the slide mold 41, and a pressing member 51.

The lower mold 30, which is a movable mold, mainly includes a base 31 that is a main body portion, and also includes a biasing means 34. The base 31 is attached to a movable platen of an injection-molding machine (not shown). A housing concave portion 35 is provided on an inner surface 32 side of the base 31, and the biasing means 34 is housed in the housing concave portion 35. Specifically, the biasing means 34 in the present embodiment is a ball plunger provided with a ball that is a rolling element at a tip end portion of a coil spring, but is conceptually illustrated for convenience of illustration. A substantially central portion on the inner surface 32 side of the base 31 is a workpiece placement region, and the insert member 2 that is a workpiece is placed thereon. Support convex portions 33 for supporting the first surface S1 on a lower side of the insert member 2 are provided in a protruding manner at a plurality of positions in the workpiece placement region. A height of the support convex portion 33 is basically equivalent to a thickness of the coating resin 3.

The upper mold 20, which is a fixed mold, mainly includes a base 21 that is a main body portion. The base 21 is attached to a fixed platen of the injection-molding machine (not shown). The upper mold 20 is disposed above the lower mold 30. An inner surface 22 of the base 21 and an inner surface 32 of the base 31 face each other. In a case of the mold apparatus 11 in the present embodiment, the lower mold 30 is driven in the mold opening and closing direction D1, whereby the upper mold 20 and the lower mold 30 can be moved toward or away from each other. FIG. 3 shows a mold opening state before the molds are closed.

A guide rail (not shown) is provided at a position on an outer side of the workpiece placement region on the inner surface 32 of the base 31 that constitutes the lower mold 30, and the slide mold 41 is provided on the guide rail. Although the slide mold 41 in the present embodiment is provided on the lower mold 30, for example, the slide mold 41 may be provided on the upper mold 20, or may be provided on both the upper mold 20 and the lower mold 30. A biasing means 42, such as a coil spring, is provided on a base end surface of the slide mold 41, and the slide mold 41 and a slide mold driving means (not shown) are connected to each other via the biasing means 42. In the present embodiment, an angular cam (not shown) that protrudes from the inner surface 22 of the upper mold 20 serves as the slide mold driving means. The angular cam is configured to push the entire slide mold 41 in a forward moving direction in accordance with a mold closing operation, and to pull back the entire slide mold 41 in a backward moving direction in accordance with a mold opening operation. Therefore, the slide mold 41 may be moved forward or backward in the moving direction D2 orthogonal to the mold opening and closing direction D1, that is, along a left-right direction in FIGS. 2 and 3. The slide mold 41 is in pressure contact with the second surface S2 of the insert member 2 during molding, and forms a part of a cavity 5 together with the base 21 of the upper mold 20 and the base 31 of the lower mold 30.

A ball plunger serving as the biasing means 34 is provided on a lower surface side of the slide mold 41 in the present embodiment, and an upward biasing force by a coil spring is constantly applied to the slide mold 41. Therefore, the slide mold 41 has a configuration movable in the mold opening and closing direction D1 as a whole. In the present embodiment, the biasing means 34 is provided at a position close to a tip end portion 41a of the slide mold 41.

In addition, as shown in FIG. 2, a plurality of fixing pieces 38 surround the workpiece placement region in regions other than the workpiece placement region on the inner surface 32 of the base 31 and other than the slide mold 41. The support convex portions 33 are also provided on these fixing pieces 38.

A housing concave portion 53 is provided at a predetermined position on an inner surface 22 side of the base 21 that constitutes the upper mold 20, specifically, at a position facing an outer peripheral portion of the workpiece placement region of the lower mold 30. The pressing member 51 is housed in the housing concave portion 53 via a biasing means 52 such as a coil spring. That is, it can be understood that the pressing member 51 is provided at a portion where the slide mold 41 is not provided among portions of the upper mold 20 and the lower mold 30 that face each other (the inner surface 22 and the inner surface 32) and at a position corresponding to the tip end portion 41a of the slide mold 41. A downward biasing force by the coil spring 52 is constantly applied to the pressing member 51. A lower end surface of the pressing member 51 that protrudes from the housing concave portion 53 is a flat surface. A region of about half the lower end surface of the pressing member 51 may be in pressure contact with the first surface S1 on an upper side of the insert member 2, and the remaining half region may be in pressure contact with an upper surface of the tip end portion 41a of the slide mold 41. Therefore, when the molds are closed, the slide mold 41 is pressed by the pressing member 51 to be moved in the mold opening and closing direction D1 (downward direction in FIG. 3).

In the present embodiment, a relationship between a load A of the coil spring (biasing means 52) that biases the pressing member 51 in a downward direction and a load B of the coil spring (the ball plunger serving as the biasing means 34) that biases the slide mold 41 in an upward direction is set to be A>B. That is, the biasing force of the pressing member 51 is larger than the biasing force of the ball plunger.

Next, a procedure for manufacturing the injection-molded article 1 by using the injection molding mold apparatus 11 having the above-described configuration will be described.

First, in a first step, as shown in FIG. 3, the insert member 2 is placed between the upper mold 20 and the lower mold 30 in a state where the upper mold 20 and the lower mold 30 are opened. Specifically, the insert member 2 is placed on the workpiece placement region of the base 31 of the lower mold 30. At this time, the first surface S1 of the insert member 2 is disposed parallel to the inner surface 32 of the base 31 (faces the mold opening and closing direction D1). On the other hand, the second surface S2 of the insert member 2 is disposed perpendicular to the inner surface 32 of the base 31 (faces a direction orthogonal to the mold opening and closing direction D1). That is, the second surface S2 having a variation in a size or a shape faces a front end surface of the slide mold 41.

Figure 4:
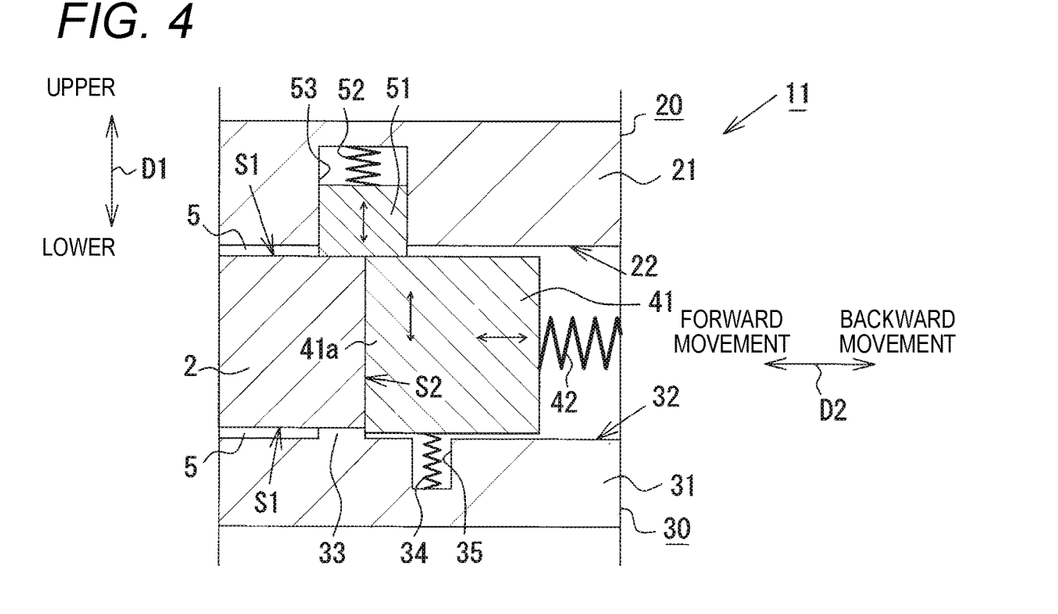
FIG. 4 is a longitudinal cross-sectional view of main parts of the mold apparatus according to the first embodiment.

In a subsequent second step, as shown in FIG. 4, the lower mold 30 is driven upward, thereby starting mold closing of the upper mold 20 and the lower mold 30. Further, during such a mold closing operation, the slide mold 41 is moved forward, and the front end surface of the slide mold 41 is in pressure contact with the second surface S2 of the insert member 2. As a result of the pressure contact by the slide mold 41, a variation in a size or a shape of the insert member 2 in a direction of the second surface S2 is absorbed. Further, the slide mold 41 is pressed downward by the pressing member 51 that abuts against the upper surface of the tip end portion 41a of the slide mold 41. In this case, the lower end surface of the pressing member 51 is in pressure contact with the first surface S1 on the upper side of the insert member 2, whereby a further downward movement of the pressing member 51 is restricted. As a result, a height of the slide mold 41 is maintained in a state where a position of an upper surface of the slide mold 41 is equal to a position of the first surface S1 on the upper side of the insert member 2. As a result of the pressure contact by the pressing member 51, a variation in a size or a shape of the insert member 2 in a direction of the first surface S1 is absorbed. Therefore, the slide mold 41 and the pressing member 51 are in close contact without a gap therebetween for a position of the insert member 2 to be the exposed portion 4 later, so that a melted thermoplastic resin does not enter an interface. Here, in the present embodiment, although the lower mold 30 is driven upward, thereby starting mold closing of the upper mold 20 and the lower mold 30, the present disclosure is not limited thereto. That is, the upper mold 20 may be driven downward, thereby starting mold closing of the upper mold 20 and the lower mold 30, When the mold closing operation is completed through a third step, the insert member 2 is fixed by being sandwiched between the upper mold 20 and the lower mold 30. As a result, the insert member 2 is fixed without shifting while a state where the variations in the two directions are absorbed is maintained. Then, the insert member 2, the upper mold 20, the lower mold 30, and the slide mold 41 form cavities 5 in a manner that positions to be the exposed portions 4 later are excluded.

Figure 5:
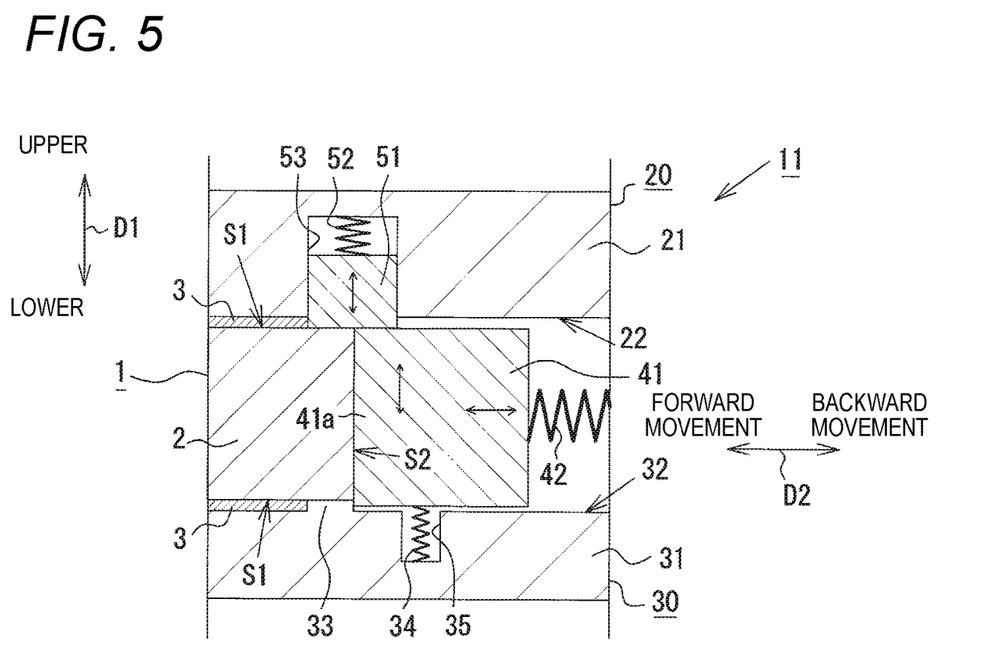
FIG. 5 is a longitudinal cross-sectional view of main parts of the mold apparatus according to the first embodiment.

In a subsequent fourth step, as shown in FIG. 5, the cavities 5 are filled by injecting a melted thermoplastic resin into the cavities 5. Thereby, no burr is generated on the exposed portions 4 each over two continuous surfaces of the insert member 2, and other portions can be integrally coated with the thermoplastic resin. Through the above series of steps, the desired injection-molded article 1 in FIG. 1 can be manufactured.

According to the present embodiment, the following effects can be obtained.

(1) According to the injection molding mold apparatus 11 and the manufacturing method using the same in the present embodiment, as described above, the slide mold 41 is also moved, by the pressing member 51, in the direction (the mold opening and closing direction D1) different from the sliding direction (that is, the moving direction D2) of the slide mold 41. Therefore, the slide mold 41 and the pressing member 51 absorb the variations in the size or the shape of the insert member 2 respectively in different directions. Therefore, the molding can be performed without generating a burr on the exposed portions 4 each over the two continuous surfaces of the insert member 2. Further, since it is not necessary to set a separate resin member in the mold to prevent generation of a burr, an increase in a cost can be prevented, and a risk of breakage of the separate resin member can also be eliminated. As described above, according to the present embodiment, the increase in the cost can be avoided, and the high-quality injection-molded article 1 without a burr on the exposed portions 4 can be manufactured.

Second Embodiment

Hereinafter, a mold apparatus 11A for molding an injection-molded article according to a second embodiment of the present disclosure will be described in detail with reference to FIGS. 6 to 10. In the present embodiment, portions different from those of the first embodiment will be described in detail, while common portions are denoted by the same reference numerals, and detailed description thereof will be omitted.

Figure 6:
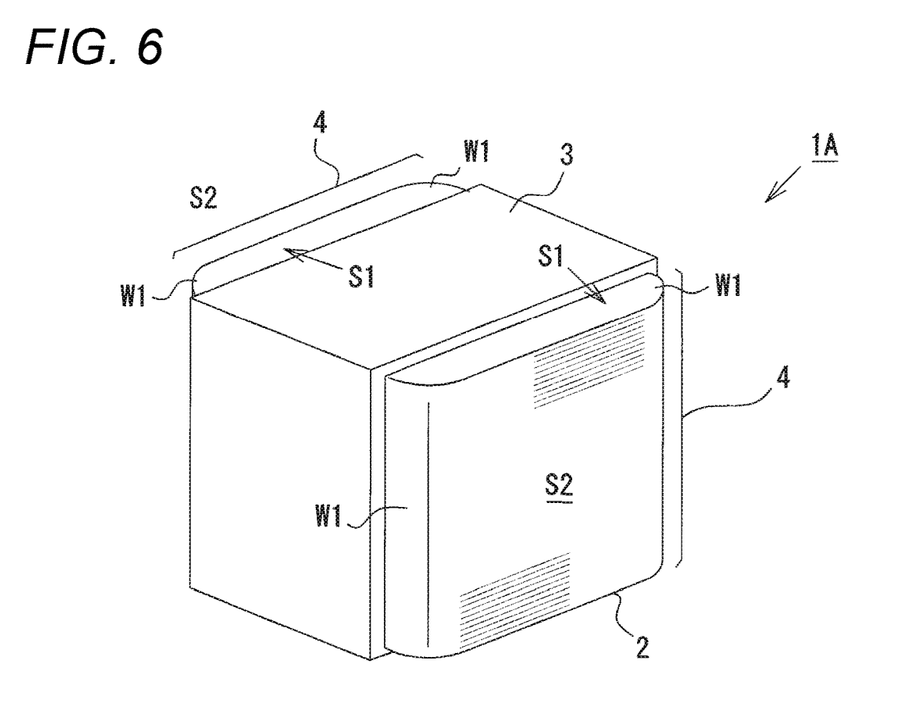
FIG. 6 is a schematic perspective view showing an injection-molded article manufactured using a mold apparatus according to a second embodiment of the present disclosure.

FIG. 6 shows an injection-molded article 1A manufactured using a mold apparatus 11A in the present embodiment. The insert member 2 is also mostly covered by the coating resin 3, and has two portions (exposed portions 4) that expose parts of the insert member 2 to outside. Although each of the exposed portions 4 in the present embodiment is formed over two continuous surfaces on the insert member 2, the exposed portion 4 extends over a range wider than that of the first embodiment. In the injection-molded article 1A, curved portions W1 of the second surfaces S2 of the insert member 2 are also exposed to outside.

Figure 7:
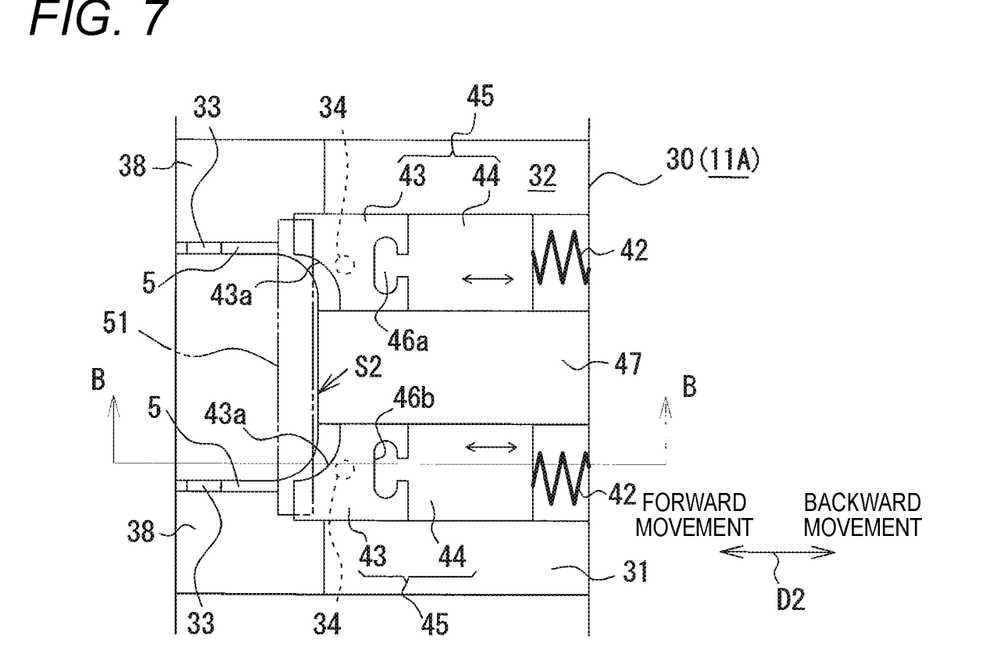
FIG. 7 is a partial plan view of a lower mold of the mold apparatus according to the second embodiment.
Figure 8:
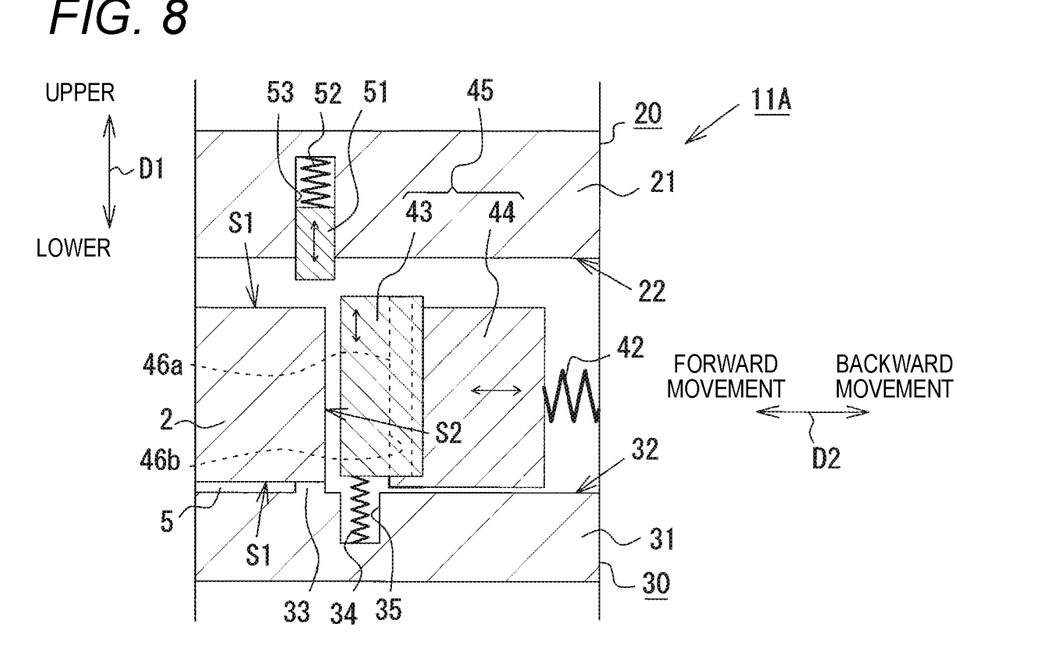
FIG. 8 is a cross-sectional view (longitudinal cross-sectional view of main parts) taken along a line B-B of the mold apparatus according to the second embodiment.

Next, the mold apparatus 11A for manufacturing the injection-molded article 1A having the above structure will be described. FIG. 7 is a partial plan view of the lower mold 30 of the mold apparatus 11A. FIG. 8 is a cross-sectional view (longitudinal cross-sectional view of main parts) taken along a line B-B in FIG. 7.

The mold apparatus 11A in the present embodiment includes a pair of slide molds 45 having a structure different from that of the slide mold 41 in the first embodiment. These slide molds 45 each include two members, that is, a main body portion 44 and a tip end portion 43 having a size smaller than that of the main body portion 44. A concave curved surface 43*a* corresponding to the curved portion W1 is formed on a front end surface of the tip end portion 43, that is, a surface in pressure contact with the insert member 2. Therefore, during molding, the concave curved surface 43*a* of the tip end portion 43 can be in close contact with the curved portion W1 of the insert member 2. Between the pair of slide molds 45, a rigid slide 47 serving as a fixed mold in which a tip end surface abuts against the second surface S2 is provided.

An engaging portion 46*a*, which has a substantially T-shaped cross section and extends along an upper-lower direction in FIG. 8, is provided in a protruding manner on a front end surface of the main body portion 44. On the other hand, an engaged portion 46*b*, which has a dovetail groove shape and extends along the same upper-lower direction in FIG. 8, is formed on a rear end surface of the tip end portion 43. Then, the engaging portion 46*a* of the main body portion 44 is slidably engaged with the engaged portion 46*b* of the tip end portion 43. Further, the biasing means 34 is provided at a position below the tip end portion 43, and constantly applies an upward biasing force to the tip end portion 43. On the other hand, a region of substantially half the lower end surface of the pressing member 51 may be in pressure contact with the first surface S1 on an upper side of the insert member 2, and the remaining substantially half region may be in pressure contact with an upper surface of the tip end portion 43 of the slide mold 45. Therefore, when the molds are closed, only the tip end portion 43 of the slide mold 45 is pressed by the pressing member 51, so that the tip end portion 43 is moved in the mold opening and closing direction D1 (downward direction in FIG. 8). On the other hand, the main body portion 44 is moved back and forth in a direction intersecting the mold opening and closing direction D1 (that is, the moving direction D2), and is not moved along the mold opening and closing direction D1.

As shown in FIG. 7, the pressing member 51 has a wide shape, and is in pressure contact with the pair of tip end portions 43 spaced apart from each other and arranged in parallel. That is, in the present embodiment in which the two slide molds 45 are provided, the common pressing member 51 presses the tip end portions 43 of the two slide molds to simultaneously move the tip end portions 43 in the same direction.

Next, a procedure for manufacturing the injection-molded article 1A by using the injection molding mold apparatus 11A having the above-described a configuration will be described.

Figure 9:
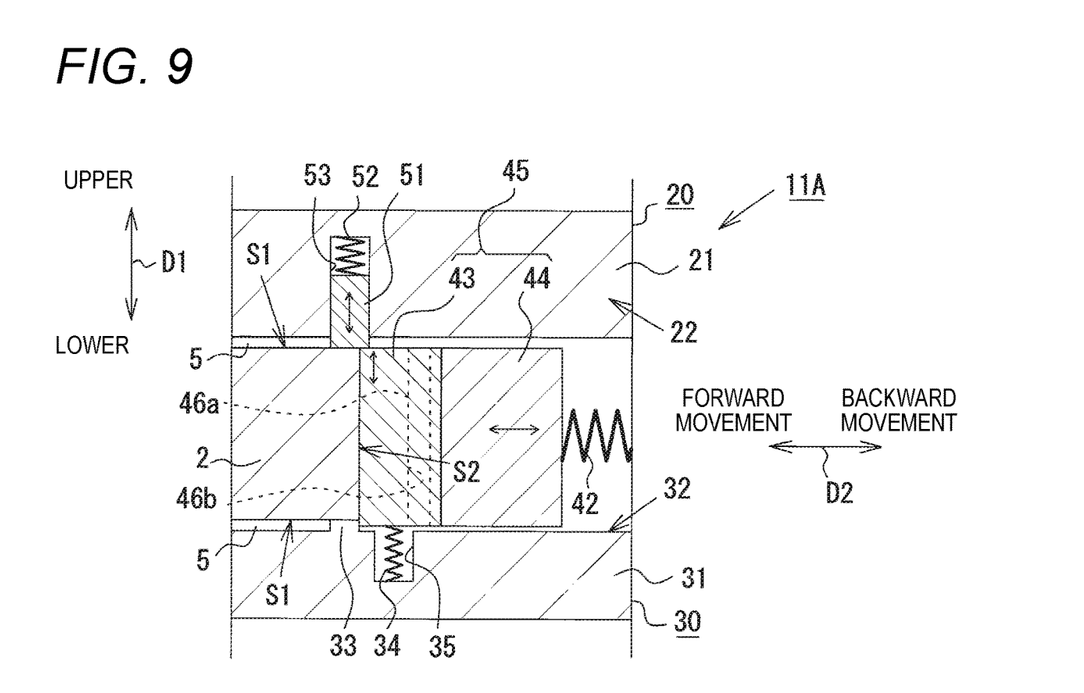
FIG. 9 is a longitudinal cross-sectional view of main parts of the mold apparatus according to the second embodiment.
Figure 10:
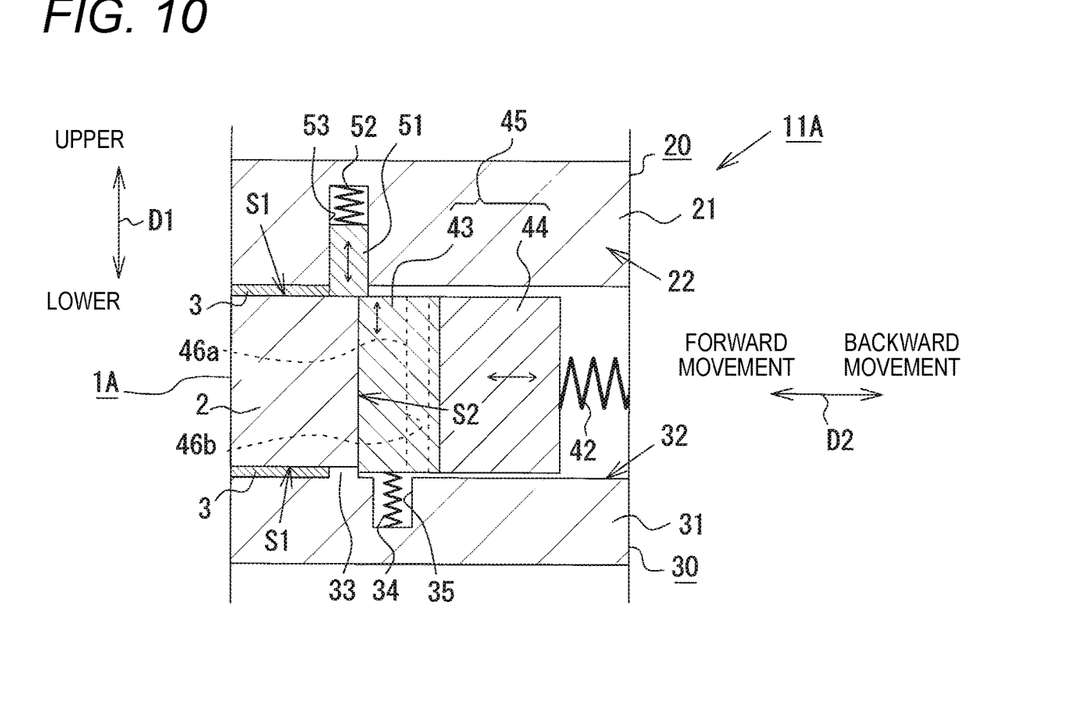
FIG. 10 is a longitudinal cross-sectional view of main parts of the mold apparatus according to the second embodiment.

First, in a first step, as shown in FIG. 8, the insert member 2 is placed between the upper mold 20 and the lower mold 30 in a state where the upper mold 20 and the lower mold 30 are opened. In a subsequent second step, mold closing is started as shown in FIG. 9. During such a mold closing operation, the slide mold 45 is moved forward, and a front end surface of the slide mold 45 is in pressure contact with the second surface S2 of the insert member 2. More precisely, the concave curved surface 43*a* of the tip end portion 43 is in pressure contact with the curved portion W1 of the second surface S2. As a result of the pressure contact by the slide mold 45, a variation in a size or a shape of the insert member 2 in a direction of the second surface S2 is absorbed. Further, each of the tip end portions 43 is pressed downward by the pressing member 51 that abuts against an upper surface of each of the tip end portions 43. In this case, the lower end surface of the pressing member 51 is in pressure contact with the first surface S1 on the upper side of the insert member 2, whereby a further downward movement of the pressing member 51 is restricted. As a result, a height position of each of the tip end portions 43 is maintained in a state where a position of the upper surface of each of the tip end portions 43 is equal to a position of the first surface S1 on the upper side of the insert member 2. As a result of the pressure contact by the pressing member 51, a variation in a size or a shape of the insert member 2 in a direction of the first surface S1 is absorbed. Therefore, the slide mold 45 and the pressing member 51 are in close contact without a gap therebetween for a position of the insert member 2 to be the exposed portion 4 later, so that a melted thermoplastic resin does not enter an interface.

When the mold closing operation is completed through a third step, the insert member 2 is fixed by being sandwiched between the upper mold 20 and the lower mold 30. As a result, the insert member 2 is fixed without shifting while a state where the variations in the two directions are absorbed is maintained. Then, the insert member 2, the upper mold 20, the lower mold 30, and the slide mold 45 form cavities 5 in a manner that positions to be the exposed portions 4 later are excluded.

In a subsequent fourth step, the cavities 5 are filled by injecting a melted thermoplastic resin into the cavities 5. Thereby, no burr is generated on the exposed portions 4 each over two continuous surfaces of the insert member 2, and other portions can be integrally coated with the thermoplastic resin. Through the above series of steps, the desired injection-molded article 1A in FIG. 6 can be manufactured relatively easily.

According to the present embodiment, in addition to the effects described in the first embodiment, following effects can be obtained.

(1) In the present embodiment, the slide molds 45, each including the main body portion 44 that is moved back and forth in the moving direction D2 and is not movable along the mold opening and closing direction D1 and the tip end portion 43 that is slidably supported by the main body portion 44 and is movable in the mold opening and closing direction D1, are used. Further, since the tip end portion 43 is smaller than the main body portion 44, the tip end portion 43 that is a movable portion is lightweight. With the structure in which only the lightweight tip end portion 43 supported by the main body portion 44 is moved in this manner, the tip end portion 43 can be moved with a smaller force by the pressing member 51. Therefore, it is not necessary to apply a very large biasing force to the pressing member 51, and simplification of a mold structure is easily achieved.

(2) In the present embodiment, a configuration is adopted in which a common pressing member 51 presses and moves the tip end portions 43 of the two slide molds 45. Therefore, the mold structure can be simplified as compared with a structure in which the tip end portions 43 of the plurality of slide molds 45 are individually pressed by a plurality of pressing members 51. Further, the movement of the tip end portions 43 of the plurality of slide molds 45 can be synchronized.

(3) In the present embodiment, the second surfaces S2 of the insert member 2 include the curved portions W1. The concave curved surface 43*a* formed on the tip end portion 43 of the slide mold 45 is in pressure contact with the curved portion W1. Therefore, when using the insert member 2 including the curved portions W1 on the second surfaces S2, even when it is desired to form the exposed portions 4 on the curved portions W1, occurrence of a burr on the curved portions W1 can be prevented.

Third Embodiment

Hereinafter, a mold apparatus for molding an injection-molded article according to an embodiment of the present disclosure will be described in detail with reference to FIGS. 11 to 12. In the present embodiment, portions different from those of the embodiment described above will be described in detail, while common portions are denoted by the same reference numerals, and detailed description thereof will be omitted.

Figure 11:
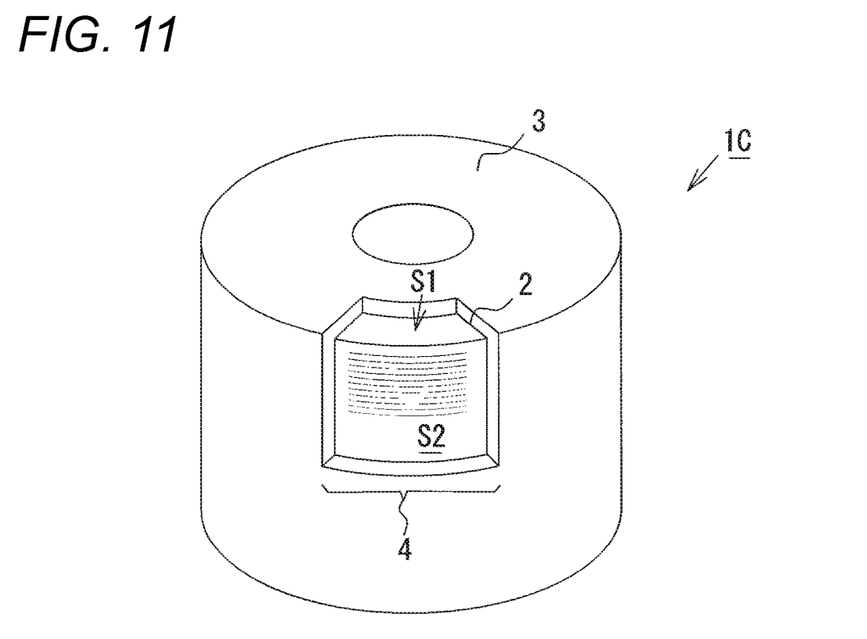
FIG. 11 is a schematic perspective view showing an injection-molded article manufactured using a mold apparatus according to a third embodiment of the present disclosure.

FIG. 11 shows an injection-molded article 1C manufactured using a mold apparatus 11C in the present embodiment. The injection-molded article 1C has a cylindrical shape. As the insert member 2, a laminated core formed by laminating a large number of annular core pieces is used. The injection-molded article 1C includes only one exposed portion 4 formed over two continuous surfaces. The exposed portion 4 does not expose the second surface S2 of the insert member 2 over an entire length of the insert member 2 in an upper-lower direction, but exposes the second surface S2 only over an upper half of the length.

Figure 12:
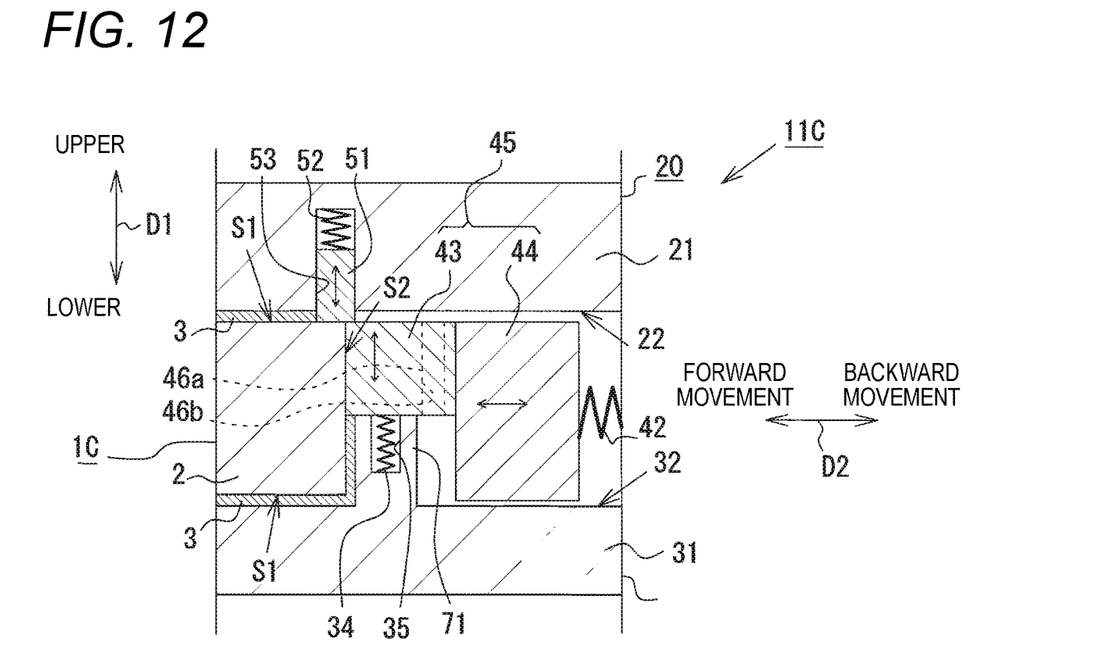
FIG. 12 is a longitudinal cross-sectional view of main parts of the mold apparatus according to the third embodiment.

As shown in FIG. 12, in the mold apparatus 11C in the present embodiment, the slide mold 45 is also used. The slide mold 45 includes the main body portion 44 and the tip end portion 43 slidably supported by the main body portion 44. However, a size of the tip end portion 43 in the upper-lower direction is about half a size of the main body portion 44 in the upper-lower direction. On the other hand, on the inner surface 32 of the base 31 that constitutes the lower mold 30, a tip end portion support step portion 71 is provided in a protruding manner to correspond to a position of the tip end portion 43. The housing concave portion 35 is provided on an upper surface side of the tip end portion support step portion 71, and the biasing means 34 is housed in the housing concave portion 35. A side surface of the tip end portion support step portion 71 forms a part of the cavity 5 during molding. Therefore, according to the mold apparatus 11C having such a configuration, the injection-molded article 1C including the exposed portion 4 as shown in FIG. 11 can be manufactured relatively easily.

Fourth Embodiment

Hereinafter, a mold apparatus for molding an injection-molded article according to an embodiment of the present disclosure will be described in detail with reference to FIGS. 13A to 14. In the present embodiment, portions different from those of the embodiment described above will be described in detail, while common portions are denoted by the same reference numerals, and detailed description thereof will be omitted.

Figure 13A:
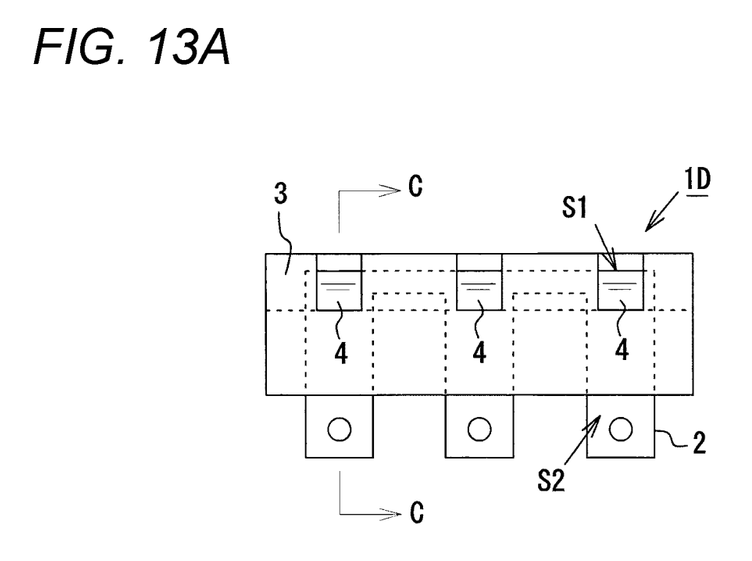
FIG. 13A is a front view showing an injection-molded article manufactured using a mold apparatus according to a fourth embodiment of the present disclosure.
Figure 13B:
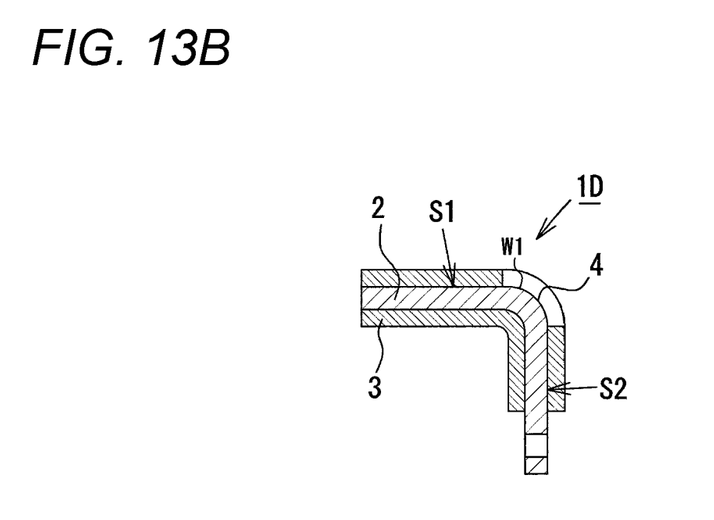
FIG. 13B is a cross-sectional view taken along a line C-C in FIG. 13A.
Figure 14:
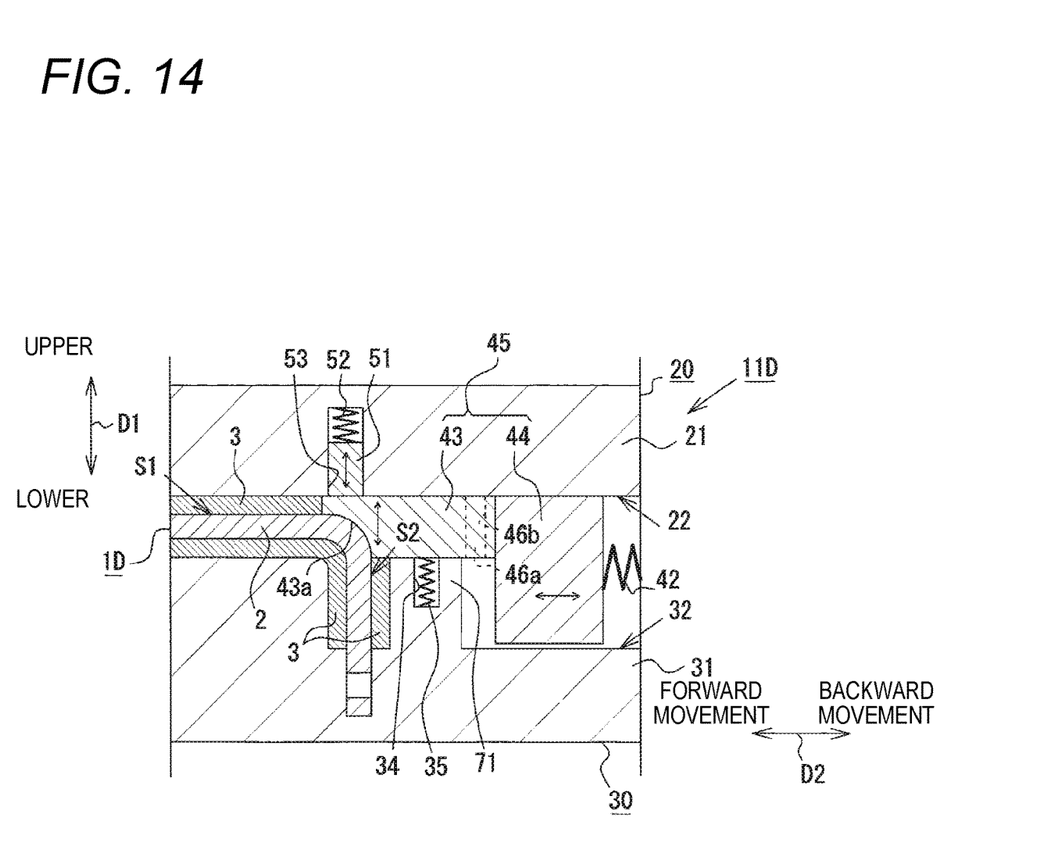
FIG. 14 is a longitudinal cross-sectional view of main parts of the mold apparatus according to the fourth embodiment.

FIGS. 13A and 13B show an injection-molded article 1D manufactured using a mold apparatus 11D in the present embodiment. A bus bar bent in a substantially L-shape is used as each of the insert members 2 of the injection-molded article 1D. The injection-molded article 1D includes three exposed portions 4 each formed over two continuous surfaces. Similar to those of the second and third embodiment described above, the mold apparatus 11D shown in FIG. 14 includes the slide mold 45 having a structure in which the tip end portion 43 is slidably supported on the main body portion 44. Further, three downward concave curved surfaces 43a are formed, corresponding to the curved portions W1 of the bus bars, on a tip end surface of the tip end portion 43. Therefore, according to the mold apparatus 11D having such a configuration, the injection-molded article 1D including the exposed portions 4 as shown in FIGS. 13A and 13B can be manufactured relatively easily.

The embodiments of the present disclosure can be optionally modified without departing from the spirit of the disclosure.

In addition to technical ideas to be described in the claims, the technical ideas understood by the embodiments described above are listed below.

(1) The slide mold and the pressing member are driven by the biasing forces of the springs serving as the biasing means. According to such a configuration, the slide mold and the pressing member can be driven by a relatively simple structure without requiring power, and the mold structure can be simplified.

(2) The main body portion includes the engaging portion. The tip end portion includes the engaged portion having the dovetail groove shape. The engaging portion is slidably engaged with the engaged portion. According to such a configuration, the tip end portion can be smoothly moved along a predetermined direction with a simple structure.

(3) The tip end portion is smaller than the main body portion. According to such a configuration, the tip end portion is lightweight, so that the tip end portion can be moved with a smaller force by the pressing member.

(4) The relationship between the load A of the spring that biases the pressing member and the load B of the spring that biases the slide mold is A>B.

(5) The pressing member abuts against both the tip end portion and the first surface of the insert member.

The present disclosure provides illustrative, non-limiting examples as follows:

According to a first aspect of the disclosure, there is provided an injection molding mold apparatus for manufacturing an injection-molded article in which an insert member is embedded in a coating resin made of a thermoplastic resin and a part of the insert member is exposed to outside, the injection molding mold apparatus including: a first mold and a second mold capable of being in contact with and separated from each other and forming a cavity into which the thermoplastic resin is configured to be injected when the first mold and the second mold are closed; a slide mold provided on at least one of the first mold and the second mold, and capable of moving back and forth in a direction intersecting a mold opening and closing direction, and forming a part of the cavity while being in pressure contact with the insert member during molding, at least a tip end portion of the slide mold being movable in the mold opening and closing direction; and a pressing member provided at a portion where the slide mold is not provided among portions of the first mold and the second mold that face each other and at a position corresponding to the tip end portion of the slide mold, being movable in the mold opening and closing direction, and pressing and moving the tip end portion in the mold opening and closing direction when the first mold and the second mold are closed.

Therefore, according to the first aspect of the disclosure, since the slide mold is moved, in accordance with the insert member in a direction (mold opening and closing direction) different from a sliding direction of the slide mold, by the pressing member, variations of the insert member respectively in different directions are absorbed by the slide mold and the pressing member. Therefore, molding can be performed without generating a burr on an exposed portion over two continuous surfaces of the insert member. Further, since it is not necessary to set a separate resin member in the molds to prevent occurrence of a burr, an increase in a cost can be prevented, and a risk of breakage of the separate resin member can also be eliminated.

According to a second aspect of the disclosure, there is provided the injection molding mold apparatus according to the first aspect, in which the slide mold includes: a main body portion configured to move back and forth in the direction intersecting the mold opening and closing direction and not movable in the mold opening and closing direction; and the tip end portion slidably supported by the main body portion and movable in the mold opening and closing direction.

Therefore, according to the second aspect of the disclosure, with a structure in which only the tip end portion supported by the main body portion is moved, the tip end portion can be moved with a smaller force by the pressing member.

According to a third aspect of the disclosure, there is provided the injection molding mold apparatus according to the first aspect or the second aspect, in which the slide mold includes a plurality of slide molds, and the pressing member is configured to press and move the tip end portions of each of the plurality of slide molds.

Therefore, according to the third aspect of the disclosure, a mold structure can be simplified as compared with a structure in which tip end portions of a plurality of slide molds are individually pressed by a plurality of pressing portions. Further, movement of the tip end portions of the plurality of slide molds can be synchronized.

According to a fourth aspect of the disclosure, there is provided the injection molding mold apparatus according to any one of the first aspect to the third aspect, in which the insert member includes a first surface that faces the mold opening and closing direction and a second surface that does not face the mold opening and closing direction, and when the first mold and the second mold are closed, the slide mold is configured to be in pressure contact with the second surface, and the pressing member is configured to be in pressure contact with the first surface.

Therefore, according to the fourth aspect of the disclosure, an absorption margin of variations of the insert member in different directions increases.

According to a fifth aspect of the disclosure, there is provided the injection molding mold apparatus according to the fourth aspect, in which the second surface of the insert member includes a curved portion, and the slide mold is configured to be in pressure contact with the curved portion.

Therefore, according to the fifth aspect of the disclosure, even when the insert member is used in which the curved portion is provided on the second surface, occurrence of a burr on the curved portion can be prevented.

According to a sixth aspect of the disclosure, there is provided the injection molding mold apparatus according to the fourth aspect, in which the slide mold has a concave curved surface.

Therefore, according to the fifth aspect of the disclosure, since the slide mold has a concave curved shape, even when the insert member is used in which a curved portion is provided on the second surface, occurrence of a burr on the curved portion can be prevented.

According to a seventh aspect of the disclosure, there is provided a method for manufacturing an injection-molded article by using an injection molding mold apparatus, the mold apparatus being for manufacturing the injection-molded article in which an insert member is embedded in a coating resin made of a thermoplastic resin and a part of the insert member is exposed to outside, the injection molding mold apparatus including: a first mold and a second mold capable of being in contact with and separated from each other and forming a cavity into which the thermoplastic resin is configured to be injected when the first mold and the second mold are closed; a slide mold provided on at least one of the first mold and the second mold, and capable of moving back and forth in a direction intersecting a mold opening and closing direction, and forming a part of the cavity while being in pressure contact with the insert member during molding, at least a tip end portion of the slide mold being movable in the mold opening and closing direction; and a pressing member provided at a portion where the slide mold is not provided among portions of the first mold and the second mold that face each other and at a position corresponding to the tip end portion of the slide mold, being movable in the mold opening and closing direction, and pressing and moving the tip end portion in the mold opening and closing direction when the first mold and the second mold are closed, the method for manufacturing the injection-molded article including: placing the insert member between the first mold and the second mold in a state where the first mold and the second mold are opened; moving the slide mold forward to cause the slide mold to be in pressure contact with the insert member, and pressing the tip end portion of the slide mold by the pressing member, during closing of the first mold and the second mold; fixing the insert member by the first mold and the second mold, and forming the cavity by the insert member, the first mold, the second mold and the slide mold; and injecting and filling the thermoplastic resin which is melted into the cavity and integrally coating a part of the insert member with the thermoplastic resin.

Therefore, according to the seventh aspect of the disclosure, the tip end portion of the slide mold is pressed by the pressing member when the slide mold is in pressure contact with the insert member during closing of the first mold and the second mold. As a result, the slide mold is moved in accordance with the insert member in a direction (mold opening and closing direction) different from a sliding direction of the slide mold. Therefore, variations of the insert member respectively in different directions are absorbed by the slide mold and the pressing member. When closing of the molds is completed, the insert member is fixed in a non-slidable manner while maintaining a state where the variations are absorbed, and the cavity is formed. Then, the thermoplastic resin which is melted is injected and filled into the cavity, whereby other portions can be integrally coated with the thermoplastic resin without generating a burr on an exposed portion of the insert member over two continuous surfaces.

As described above in detail, according to the disclosure described in the first aspect to the seventh aspect, the injection molding mold apparatus for molding the injection-molded article and the method for manufacturing the injection-molded article can be provided in both of which, during manufacturing of the injection-molded article including the exposed portion continuous over two surfaces, the insert molding can be performed without generating a burr on the exposed portion on each surface while avoiding the increase in the cost.

What is claimed is:

1. An injection molding mold apparatus for manufacturing an injection-molded article in which an insert member is embedded in a coating resin made of a thermoplastic resin and a part of the insert member is exposed to outside, the injection molding mold apparatus comprising:
a first mold and a second mold configured to contact and separate from each other, the first mold and the second mold forming a cavity into which the thermoplastic resin is configured to be injected when the first mold and the second mold are closed in contact with each other;

a slide mold provided on at least one of the first mold and the second mold, the slide mold being configured to move back and forth in a direction intersecting a mold opening and closing direction, the slide mold including a top surface that faces the first mold, and the slide mold forming a part of the cavity while being in pressure contact with the insert member during molding, at least a tip end portion of the slide mold being movable in the mold opening and closing direction; and a pressing member located at a portion where the slide mold is not provided among portions of the first mold and the second mold that face each other and at a position corresponding to the tip end portion of the slide mold, the pressing member being movable in the mold opening and closing direction, the pressing member pressing and moving the tip end portion in the mold opening and closing direction when the first mold and the second mold are closed in contact with each other, and the top surface of the slide mold is biased in the mold opening and closing direction to be in contact with the pressing member.

2. The injection molding mold apparatus according to claim 1, wherein the slide mold includes:

a main body portion configured to move back and forth in the direction intersecting the mold opening and closing direction and not movable in the mold opening and closing direction; and the tip end portion slidably supported by the main body portion and movable in the mold opening and closing direction.

3. The injection molding mold apparatus according to claim 1, wherein the slide mold includes a plurality of slide molds, and the pressing member is configured to press and move the tip end portions of each of the plurality of slide molds.

4. The injection molding mold apparatus according to claim 1, wherein:

the insert member includes a first surface that faces the mold opening and closing direction and a second surface that does not face the mold opening and closing direction, and when the first mold and the second mold are closed, the slide mold is configured to be in pressure contact with the second surface, and the pressing member is configured to be in pressure contact with the first surface.

5. The injection molding mold apparatus according to claim 4, wherein the second surface of the insert member includes a curved portion, and the slide mold is configured to be in pressure contact with the curved portion.

6. The injection molding mold apparatus according to claim 4, wherein the slide mold has a concave curved surface.

7. The injection molding mold apparatus according to claim 1, wherein a surface of the slide mold is in contact with the insert member when the thermoplastic resin is injected, and the surface of the slide mold is not perpendicular to the mold opening and closing direction.

8. An injection molding mold apparatus for manufacturing an injection-molded article in which an insert member is embedded in a coating resin made of a thermoplastic resin and a part of the insert member is exposed to outside, the injection molding mold apparatus comprising:

a first mold and a second mold configured to contact and separate from each other, the first mold and the second mold forming a cavity into which the thermoplastic resin is configured to be injected when the first mold and the second mold are closed in contact with each other;

a slide mold provided on at least one of the first mold and the second mold, the slide mold being configured to move back and forth in a direction intersecting a mold opening and closing direction, and the slide mold forming a part of the cavity while being in pressure contact with the insert member during molding, at least a tip end portion of the slide mold being movable in the mold opening and closing direction; and a pressing member provided in and attached to another one of the first mold and the second mold, which the slide mold is not attached, the pressing member being located at a position to be biased in the mold opening and closing direction to contact the tip end portion of the slide mold and the insert member simultaneously, the pressing member pressing and moving the tip end portion in the mold opening and closing direction when the first mold and the second mold are closed in contact with each other.

9. The injection molding mold apparatus according to claim 8, wherein a surface of the slide mold is in contact with the insert member when the thermoplastic resin is injected, and the surface of the slide mold is not perpendicular to the mold opening and closing direction.

10. A method for manufacturing the injection-molded article by using the injection molding mold apparatus according to claim 1, the method for manufacturing the injection-molded article comprising:

placing the insert member between the first mold and the second mold in a state where the first mold and the second mold are opened;

moving the slide mold forward to cause the slide mold to be in pressure contact with the insert member and pressing the tip end portion of the slide mold by the pressing member, during closing of the first mold and the second mold;

fixing the insert member by the first mold and the second mold, and forming the cavity by the insert member, the first mold, the second mold, and the slide mold; and injecting and filling the thermoplastic resin which is melted into the cavity and integrally coating a part of the insert member with the thermoplastic resin.

* * * * *